United States Patent [19]
Swallow

[11] Patent Number: 5,820,958
[45] Date of Patent: Oct. 13, 1998

[54] NON-CRACKING, SMOOTH, AND FLAT PATCH FOR WALL CRACKS

[76] Inventor: Kevin W. Swallow, 1120 W. 76th Ter., Kansas City, Mo. 64114

[21] Appl. No.: 886,183

[22] Filed: Jul. 1, 1997

[51] Int. Cl.⁶ ........................................... B32B 7/06
[52] U.S. Cl. ..................... 428/42.2; 428/40.1; 428/194; 428/63; 52/514
[58] Field of Search .................. 428/40.1, 42.2, 428/194; 52/417, 514

[56] References Cited

U.S. PATENT DOCUMENTS

| | | | |
|---|---|---|---|
| 3,455,077 | 7/1969 | Long | 52/459 |
| 4,042,739 | 8/1977 | Emal et al. | 428/137 |
| 4,122,222 | 10/1978 | Parker | 428/66 |
| 4,135,017 | 1/1979 | Hoffmann, Sr. | 428/78 |
| 4,358,495 | 11/1982 | Parker | 428/66 |
| 4,602,971 | 7/1986 | Bergeron et al. | 156/94 |
| 4,707,391 | 11/1987 | Hoffman, Sr. | 428/63 |
| 4,732,633 | 3/1988 | Porkny | 156/94 |
| 4,776,906 | 10/1988 | Bernard | 156/85 |
| 4,959,251 | 9/1990 | Owens et al. | 428/41 |
| 4,989,385 | 2/1991 | McCullough | 52/514 |
| 5,204,148 | 4/1993 | Alexander et al. | 428/40 |
| 5,447,006 | 9/1995 | Zenor | 52/741.4 |

Primary Examiner—Alexander Thomas
Attorney, Agent, or Firm—Kenneth W. Iles

[57] ABSTRACT

A elastic membrane includes a pair of parallel strips of a lamination consisting of a non-stretchable plastic film coated on both sides with a pressure sensitive adhesive, resulting in a pair of pressure sensitive adhesive bands bonded to a rear side of the membrane along each lengthwise edge of the elastic membrane, leaving an uncoated midsection of elastic membrane. The adhesive bands are covered with a release liner, with longitudinal slits cut through it to allow selective removal from one adhesive band or the other or a portion of one adhesive band as desired during installation. One side of the elastic membrane is attached to the wall surface adjacent to a crack to be covered and repaired, and the midsection of the elastic membrane is stretched across the crack and the other elastic band is pressed against the wall. The elastic membrane can be treated with spackle or dry wall mud to blend into the surrounding wall and can be painted.

22 Claims, 4 Drawing Sheets

NON-CRACKING, SMOOTH, AND FLAT PATCH FOR WALL CRACKS

FIELD OF THE INVENTION

The present invention is related to an apparatus and process for patching cracks in interior building walls. More particularly, the present invention is directed to an apparatus and process for patching cracks in interior walls so that the patch does not crack when subjected to subsequent movement or expansion and contraction of the surrounding wall.

DESCRIPTION OF RELATED ART INCLUDING INFORMATION DISCLOSED UNDER 37 C.F.R. SECTIONS 1.97–1.99

Wall and ceiling cracks in interior walls are typically the result of foundation settling due to fluctuations in soil moisture, temperature, humidity, freeze-thaw cycles, and vibrations. Many of these circumstances continue to affect the building throughout its life, causing new cracks to form and causing previously patched cracks to reappear.

The search for an effective, economical, and permanent repair for walls and ceiling cracks, which will accommodate subsequent expansion and contraction of the repaired crack has led to many attempted solutions that are subject to failure during subsequent expansion and contraction of the repaired site.

One traditional method of repairing cracks is to fill the crack with spackling compound or a similar substance. This method of repair results in a rigid repair that is subject to re-cracking, when the same forces that originally caused the crack are re-exerted on the repair.

Another traditional method for repair of cracks is to cover the crack with paper tape or a fiberglass mesh onto which a layer of drywall mud or spackling compound is applied. The repaired area is then sanded and painted, providing a surface that is blended with the surrounding surfaces. Future wall movement, however, causes the repair to re-crack because the patch is too rigid and does not have the mechanical strength to accommodate or prevent subsequent wall movement. To repair the crack again requires removal of some or all of the previously applied patch.

Efforts to overcome these disadvantages of traditional patching methods have led to a number of issued United States Patents. For example, U.S. Pat. No. 3,455,077, issued to Long on Jul. 15, 1969, discloses a "Joint Sealing Tape" comprising a strip of flexible plastic material having reinforcing strips embedded into the plastic material, which is preferably ethylene-propylene rubber, which is fastened to a joint with a solvent based adhesive that is applied to the wall. The solvent is preferably an adhesive of high molecular weight polyisobutylene containing some low molecular weight polymer, varnish maker's naphtha and painter's grade naphtha. Using the Long patch requires a considerable collection of hazardous chemical solvents. The rubber patch of Long is necessarily so thick (0.752 mm; 0.03 in) that it is difficult to conceal. The thickness of the Long patch makes it strong enough that, when stretched, the rubber is likely to pull one or both reinforcement strips free from the wall. Further, the oils in the rubber will discolor latex-based paint applied over it. Finally, concealment of the Long patch is difficult because the thick (0.762 mm) rubber material temporarily compresses along the center of the patch during sanding, making it difficult to blend the patch into the wall.

U.S. Pat. No. 4,959,251, issued to Owens et al. on Sep. 25, 1990, discloses an "Elastic Patch for Holes in Walls" comprising a two-sided pressure sensitive adhesive tape fixed to the back of a patch that has its thickest dimension at its center and which tapers toward the outer perimeter. The patch is made of polyvinyl chloride or the like and the adhesive is preferably made from an acrylic base. A removable skin protects the adhesive and includes perforations to facilitate removal of separate portions of the removable skin. Owens et al. '251 is designed for repairing holes in walls-not cracks. The thickened center portion of Owens et al. '251 requires a crack to be widened or otherwise altered to accommodate this thick portion. The thickened center also produces a large resistive force when stretched. Thus if a joint expands an Owens et al. '251 patch will break free of the wall along one or more edges. Finally, this patch is expensive to manufacture, as the non-uniform cross sectional thickness requires that the patch be extruded using advanced extrusion techniques, or to be molded.

U.S. Pat. No. 4,776,906, issued to Bernard on Oct. 11, 1988, discloses a "Repair Method for Drywalls and Like Construction Materials" comprising a plastic film that is fitted over a crack by parallel adhesive strips on the plastic sheet, which is shrunk and adhered over a crack by heating, as with an electric hair dryer. The heat shrink film of the Bernard '906 patch, however, lacks shape memory, so it sustains permanent deformation when stretched. Therefore, the patch buckles when the crack contracts, thus revealing the presence of the patch. If the crack expands, the plastic film stretches directly above the crack, causing a crack in the paint applied to the patch. The patch can be re-shrunk through application of heat, but lacks the convenience of a permanent repair. Further, repeated application of heat to re-shrink the patch is likely to damage the finish coat of paint.

Therefore, a need exists for a patch for cracks in interior walls, such as drywall, plasterboard, plaster, or the like, that will expand and contract without change in appearance; that can be finished to be entirely invisible relative to the surrounding wall, that will not pull loose from the wall, and that is permanent.

SUMMARY OF THE INVENTION

Accordingly, it is a primary object of the present invention to provide a patch for cracks in interior walls, such as drywall, plasterboard, plaster, or the like that expands and contracts without change in appearance.

It is a further object of the present invention to provide a patch for cracks in interior walls, such as drywall, plasterboard, plaster, or the like that can be finished to be entirely invisible relative to the surrounding wall.

It is a further object of the present invention to provide a patch for cracks in interior walls, such as drywall, plasterboard, plaster, or the like that will not pull loose from the wall.

It is a further object of the present invention to provide a patch for cracks in interior walls, such as drywall, plasterboard, plaster, or the like that is permanent.

These and other objects of the invention are achieved by providing a patch having a flexible or elastic membrane of uniform cross section that can be repeatedly stretched and released without rupturing, and forming a strong bond with paint, even when stretched. When the patch is provided in the form of a tape, a pair of spaced parallel bands of non-stretchable plastic film coated on both sides by a pressure sensitive adhesive covers the back side of the elastic membrane along its longitudinal edges, leaving a midsection free of adhesive. The outermost adhesive bands are each covered with and protected by a separate release liner that is removed and discarded upon installation. The patch body is preferably made from a melt processable elastic material such as polyvinyl chloride or the like and the adhesives are preferably acrylic based adhesives. The non-stretchable plastic film prevents stretching of the margins of the patch body, a function crucial to successful function of the patch itself.

To install the patch, the release liner on one edge is removed, exposing the adhesive. The patch is aligned with the crack and the exposed adhesive is pressed against the wall. The width of the tape is sightly stretched across the crack and the above procedure is repeated for the opposite edge of the path. Installation is discussed in more detail below.

In an alternative embodiment, a release liner spans the width of the patch and includes a number of parallel perforation lines or slits that allow separate sections of the release liner to be removed in a desired sequence. The preferred number of perforation lines is three, resulting in four separately removable bands of release liner material.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE PREFERRED EMBODIMENTS

As required by the Patent Statutes and the case law, the preferred embodiment of the present invention and the best mode currently known to the inventor for carrying out the invention are disclosed in detail herein. The embodiments disclosed herein, however, are merely illustrative of the invention, which may be embodied in various forms. Therefore, specific structural and functional details disclosed herein are not to be interpreted as limiting, but merely to provide the proper basis for the claims and as a representative basis for teaching one skilled in the art to which the invention pertains to make and use the apparatus and process disclosed herein as embodied in any appropriately specific and detailed structure.

Figure 1:
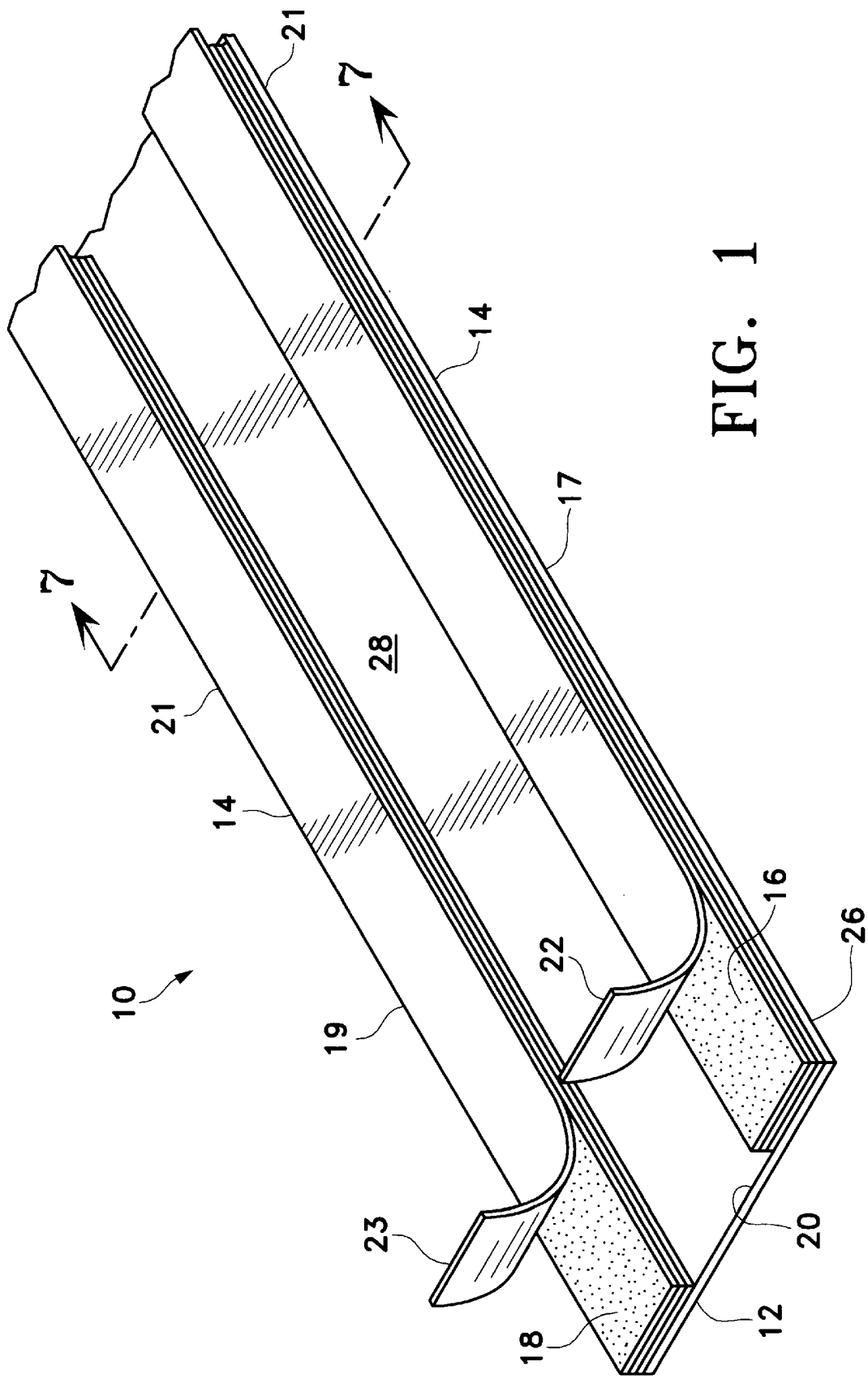
FIG. 1 is right-hand front perspective view of a patch for repairing cracks in interior walls according to the present invention.
Figure 6:
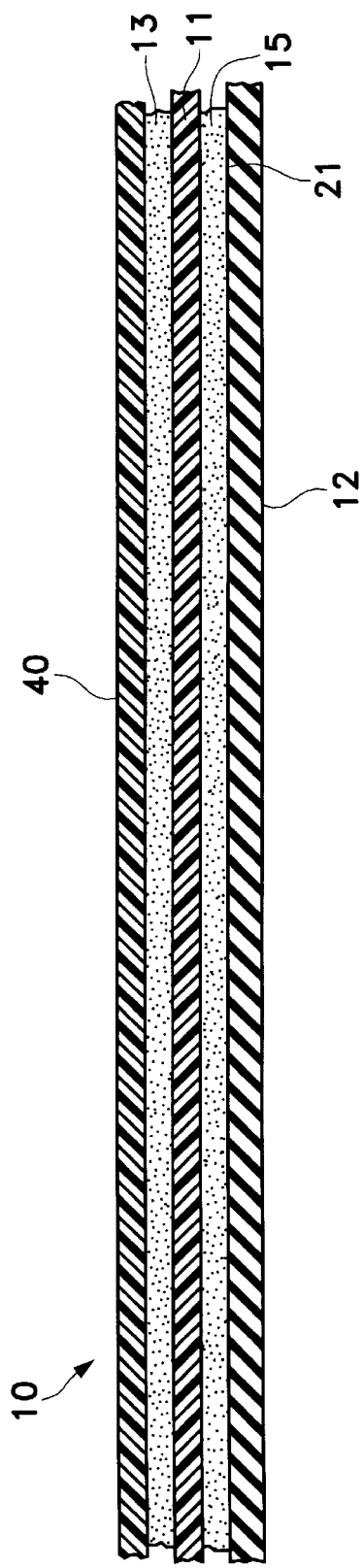
FIG. 6 is an enlarged cross section taken along lines 6—6 of FIG. 5.
Figure 7:
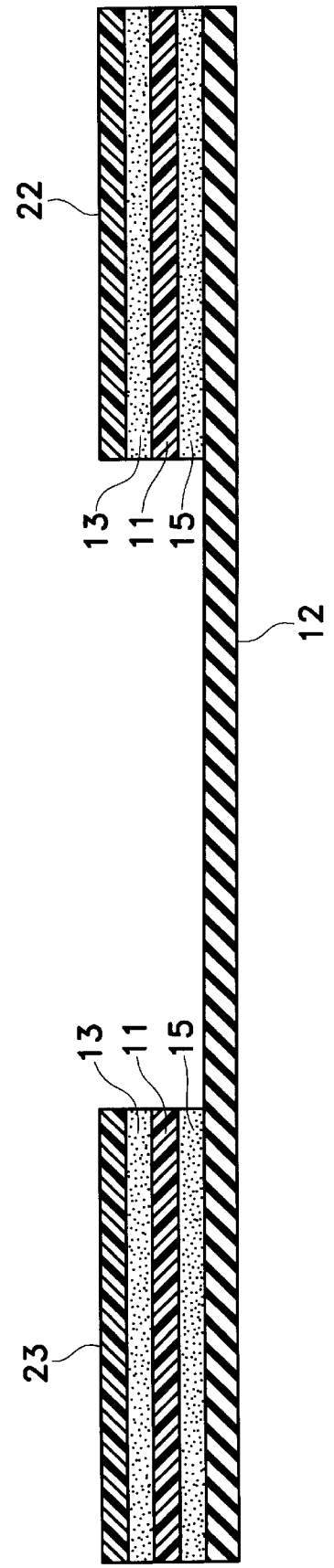
FIG. 7 is an enlarged cross section taken along lines 7—7 of FIG. 1.

Referring now to FIG. 1, a patch 10 according to the present invention includes an elastic resilient membrane 12 of uniform thickness, or cross section, that can be repeatedly stretched and released without rupturing, having a strong shape memory, and forming a strong bond with paint, even when stretched. A band of non-stretchable plastic film 11 is coated on both sides with an adhesive layer (See FIG. 6), basically creating a double-sided tape. The plastic film 11 has a thickness lying in a range of 0.0002–0.001 inches (0.05–0.1 mm), with the preferred thickness being 0.0005 inches (0.0127 mm). The outer, or top adhesive layer 13 will adhere the patch 10 to the wall 29, while the inner, or lower adhesive layer 15 adheres the plastic film 11 to the elastic membrane 12. The terms top and lower are interpreted as the patch 10 is shown in FIG. 6. The non-stretchable plastic film 11 is a crucial feature of the patch, as it restricts the stretchable portion of the patch 10 to the central portion of the patch 10. The combination of the plastic film 11 and the adhesives layers 13, 15 will be referred to collectively as a band of pressure sensitive adhesive 21. A band of pressure sensitive adhesive of uniform width and thickness is applied to an area along each of the outer edges 14 of the elastic membrane 12, resulting in a right-hand side adhesive band 16 and a left-hand side adhesive band 18, both applied to the rear side 20, that is, the side closest to the viewer in FIG. 1 of the elastic membrane 12. The terms left-hand side and right-hand side are relative to the orientation of the patch 10 in FIG. 1, with the reference numerals 12 and 20 being located at the front edge of the patch 10. The pressure sensitive layer of adhesive 15 is applied directly to the rear surface 20 of elastic membrane 12, to which it adheres, and both pressure sensitive adhesive bands 16, 18 are covered with a protective release liner having slits that divide the release liner into release liner strips 22, 23. The release liner does not adhere firmly to the pressure sensitive adhesive bands 16, 18 and it is removed progressively when the patch is applied. The release liner 22, 23 is discarded when a repair is completed.

The elastic membrane 12 is preferably made with a smooth finish on the face side 26, which will be the side visible from the room or space in which the patch 10 is used to cover a crack 24 and on the rear side 20. In an alternative embodiment, however, a textured finish may be substituted on both sides of the elastic membrane 12.

The elastic membrane 12 has a thickness, that is, the distance between the face side 26 and the rear side 20, within a range of 0.125 mm (0.005 inches) to 0.560 mm (0.022 inches), and is preferably about 0.230 mm (0.009 inches) thick. The preferable width of the pressure sensitive bands 16, 18 is about 44.5 mm (1.75 inches) and the uncoated midsection 28 of the elastic membrane 12 has a preferred width of about 50.8 mm (2.0 inches). These general dimensions, however, may be changed to provide customized patches, depending on the straightness of the crack to be concealed and the anticipated wall movement to be absorbed. The thickness of the pressure sensitive bands 16, 18 lies generally in a range of 0.025 mm (0.001 inches) to 0.178 mm (0.007 inches), with a preferred thickness of about 0.089 mm (0.0035 inches). The thicknesses of the elastic membrane 12 and the pressure sensitive adhesive bands 16, 18 are critical to the success of the patch 10. The lower limit of the thickness of the elastic membrane 12 insures that the tensile strength of the elastic membrane 12 is sufficient to contract even with a paint film applied to the membrane 12. A membrane thinner than 0.125 mm lacks sufficient tensile strength to force the paint film into contraction after the patch 10 is painted over. This problem is made worse as additional coats of paint are applied. An elastic membrane thickness greater than 0.125 mm is also important to insure that the patch is durable enough to withstand abrasion from sanding. An elastic membrane formulated with a higher durometer hardness rating will generally be more tolerant of abrasion, such as sanding. The higher the limit of the thickness of the membrane 12 is important because a membrane that is too thick will be impossible to conceal by blending the repaired surface with the surrounding wall. Further, if the elastic membrane 12 is too thick, the strength of the adhesive in the bands 16, 18, which are secured to the surrounding wall, may be overcome by the strength of the stretched elastic membrane 12, that is, the forces pulling the installed and stretched elastic membrane 12 back to its normal, or relaxed, position, may tear the an adhesive band 16, 18 from the wall surface 30 (See FIGS. 2, 3). The thickness of the release liner strips 22, 23 is relatively unimportant, provided that the pressure sensitive adhesive bands 16, 18 are sufficiently protected strips 22use and that the release liner strips 22, 23 do not tear as they are removed from a roll of the patch 10 material.

The membrane 12 of the patch 10 is fabricated from a melt processable elastic material such as polyvinyl chloride or the like, which can be painted with either latex or oil based paints and which has little tendency to leach out plasticizer over time. Moreover, when the elastic membrane 12 is made of polyvinyl chloride, an acrylic based adhesive is preferred for the adhesive layers 13, 15 (See FIG. 6). The bond formed by an acrylic adhesive becomes stronger and hence more permanent over time. The elastic membrane 12 is preferably formulated to have a Type A durometer hardness between 40 and 100, with 70 being the preferred Type A durometer hardness as tested in ASTMD2240.

The elastic membrane 12 retains a memory of its original shape, even when stretched for extended periods of time, even many years. The amount of elongation remaining after the membrane 12 is stretched is referred to as permanent set. An elastic membrane with a low permanent set is preferred because it maintains tension during elongation, or other stretching, thus allowing it to absorb subsequent contraction, as the wall moves on one or both sides of the crack 24. The elastic membrane 12 is formulated to have a permanent set of less than 15%, as tested in ASTMD412. Because, however, the test conditions in ASTMD412 are not representative of the conditions encountered in actual use of the patch 10, the elastic membrane 12 must also be tested using an Extended Time Elongation Test (ETET), defined as follows: stretch a test specimen to 110% of its original length for a period of six months; after six months, release the specimen and allow it to relax for one month; after the relaxation period, measure the final length of the specimen. The permanent set as measured by the ETET must be 0–5% following a 100% stretch for six months and a release period of one month. That is the final length of the specimen after to ETET must be equal to or less than 105% of its original length.

Figure 2:
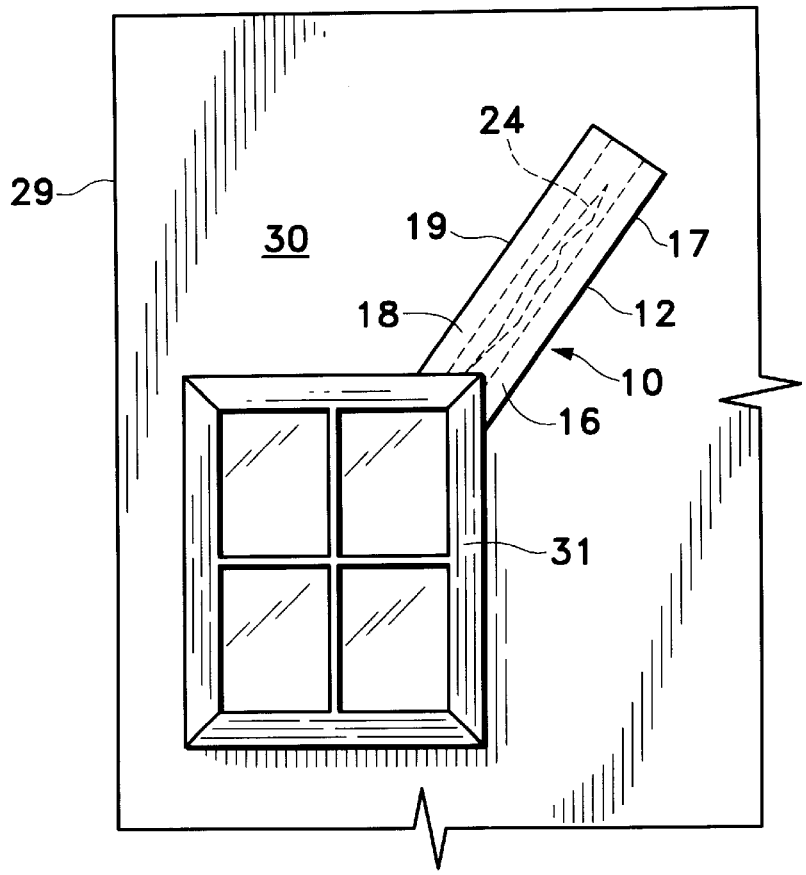
FIG. 2 is a front elevation of an interior wall having a crack that has been patched with the patch of FIG. 1.
Figure 3:
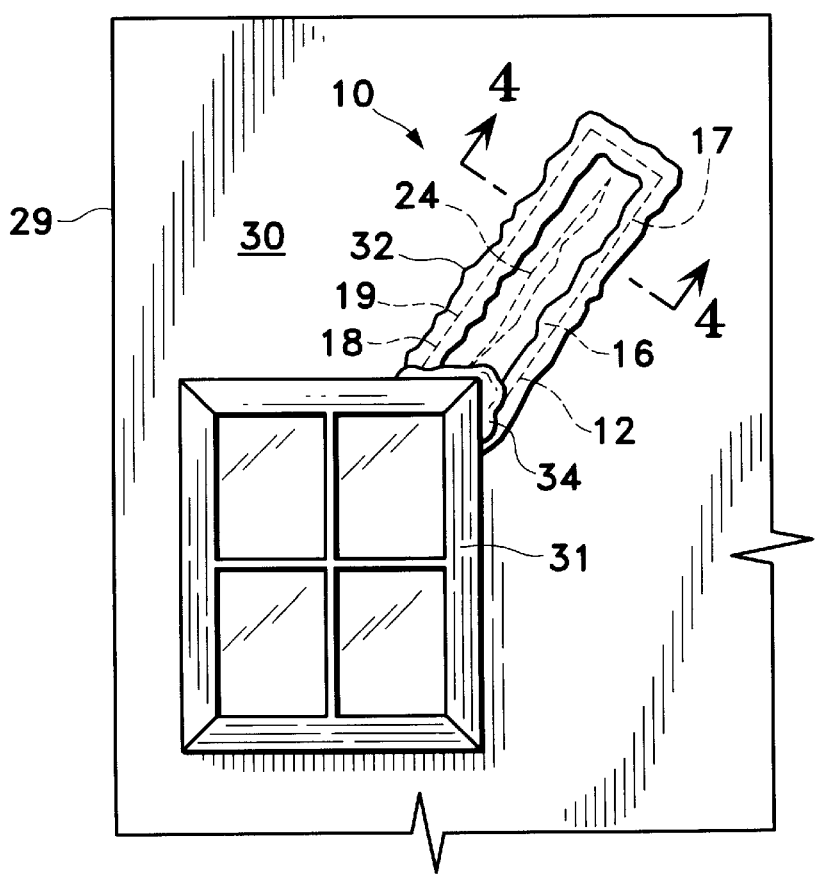
FIG. 3 is a front elevation as in FIG. 2 further illustrating the application of drywall mud or spackling around the edges of the patch and adjoining wall surface.
Figure 4:
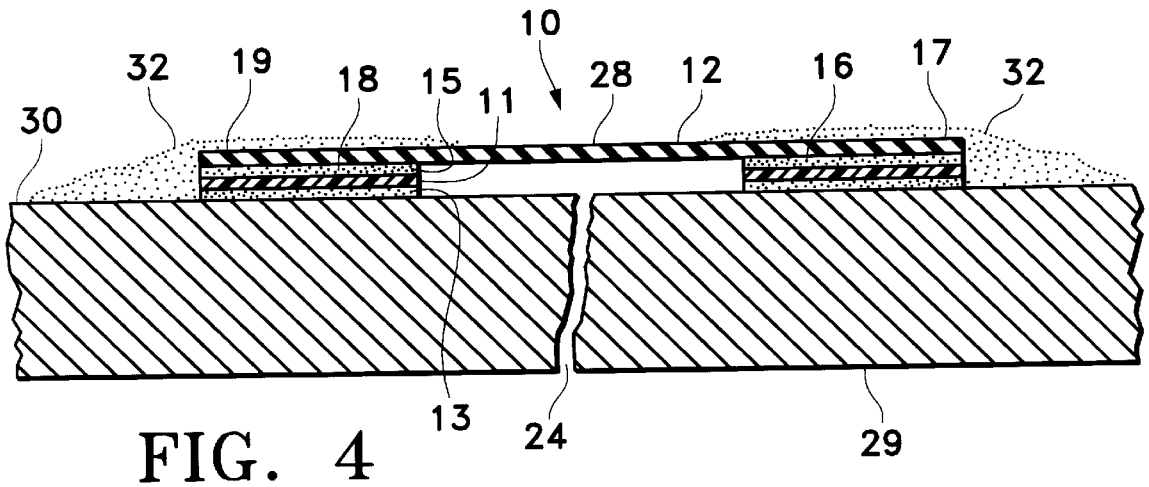
FIG. 4 is cross section taken along the lines 4—4 of FIG. 3.

Referring now to FIGS. 2, 3, and 4, the patch 10 is installed as follows. The patch 10 can be installed adjacent to a window 31 (FIGS. 3 and 4), door or other fixture, regardless of the angle of the crack. First, the areas of the wall surface 30 adjacent to the crack 24 are prepared to provide a good bonding surface. During surface preparation, the surface is cleaned of grease, oil, dust, and other foreign materials. Loose material in the crack is removed with a tool such as a screwdriver or putty knife. The crack 24 is left in this condition and is not filled with spackle or the like because the crack 24 must have room for future movement in both directions, that is, for both expansion and contraction of the crack 24. Any chalky unpainted surfaces are then painted. The pressure sensitive adhesive strips 16, 18 will not stick to surfaces that are chalky, greasy, oily, or dusty. Second, following surface preparation, a length of the patch 10 material is cut to extend about 5 cm (2 inches) beyond each end of the crack 24, if the ends of the crack 24 permit. If an end of the crack 24 abuts a floor, ceiling, window frame, door frame, or the like, the patch 10 stops where the dissimilar materials or surfaces abut. Third, the protective release liner 22 is removed to expose one or the other band of pressure sensitive adhesive 16 or 18. Either the right-hand side 17 or the left-hand side 19 of the patch 10 may be applied first. Fourth, the uncoated midsection 28 of the elastic membrane 12 is aligned with the crack 24 and the exposed pressure sensitive adhesive strip 16 or 18 is pushed against the wall surface 30 using hand pressure.

Fifth, the remaining protective release liner strip 22 is removed for the remaining adhesive band 16 or 18, and a small force is applied to pre-stretch the midsection of the elastic membrane 12 to pull it snugly across the crack 24 and the remaining pressure sensitive band 16 or 18 is applied to the wall surface 24 while the uncoated midsection 28 of the membrane 12 is still stretched. A pre-stretch of approximately 2.0 mm (0.08) inches to 4 mm (0.16 inches) is recommended. Small successive lengths of the membrane 12 of the patch 10 may be stretched and adhered separately. The plastic film 11 layer in the adhesive strips 16, 18, prevent stretching the portions of the elastic membrane 12 that will be fixed to the wall surface 30, thereby creating a stronger bond on the wall surface 30 and strong anchoring lines that will allow the central portion of the patch to flex in response to wall movement, without breaking loose from the wall, buckling, or rupturing. If the midsection 28 of the patch 10, that is, the central portion of the membrane 12, is not stretched prior to installation, subsequent contraction of the crack 24 will cause the patch 10 to deflect outward, crating a bubble. A 2.5 mm (0.10 inch) contraction, for example, will result in an 8.9 mm (0.35 inch) outward deflection of the patch 10 away from the plane of the adjacent wall surface 30.

Sixth, if either end of the patch abuts a floor, ceiling, window frame, door frame, or the like, a permanently non-rigid compound, such as latex based caulking compound 34 (See FIG. 3) may be used to adhere and blend the patch 10 ends.

The patch 10 is now completely installed and ready to be blended into the wall surface 30 with spackling 32. The appearance of the patch 10 is blended into the wall surface 30 by applying spackling along each edge and end of the patch 10 with a blade or putty knife, using care not to spackle or otherwise cover the central stretched portion 28 of the elastic membrane 12 with any material that is or will become substantially rigid. Rigid materials applied to the midsection 28 will prevent the patch 10 from floating over the crack 24 when the wall subsequently moves along the crack 24 or they will form a conspicuous crack. The spackling compound 32 is then sanded and reapplied as required according to well known techniques until the edges of the patch 10 are covered and the patch 10 is as nearly invisible as possible. Use of a sanding block is recommended for this step. Gradually finer sandpaper is used to blend the areas of spackling 22 until smooth to the touch. The patch 10 is then ready for the application of paint, texture, or other finish surface that will match and blend into the wall surface 30. In this connection, the elastic membrane 12 is preferably white or off-white for easier concealment. If the center portion 28 of the patch 10 is to be covered with a texturing compound, it must be a flexible material. It has been found that texturing can be simulated by applying a latex-based caulking compound to the central, stretchable portion of the patch 10 and without interference to the operation of the patch 10 when the crack 24 changes size.

Figure 5:
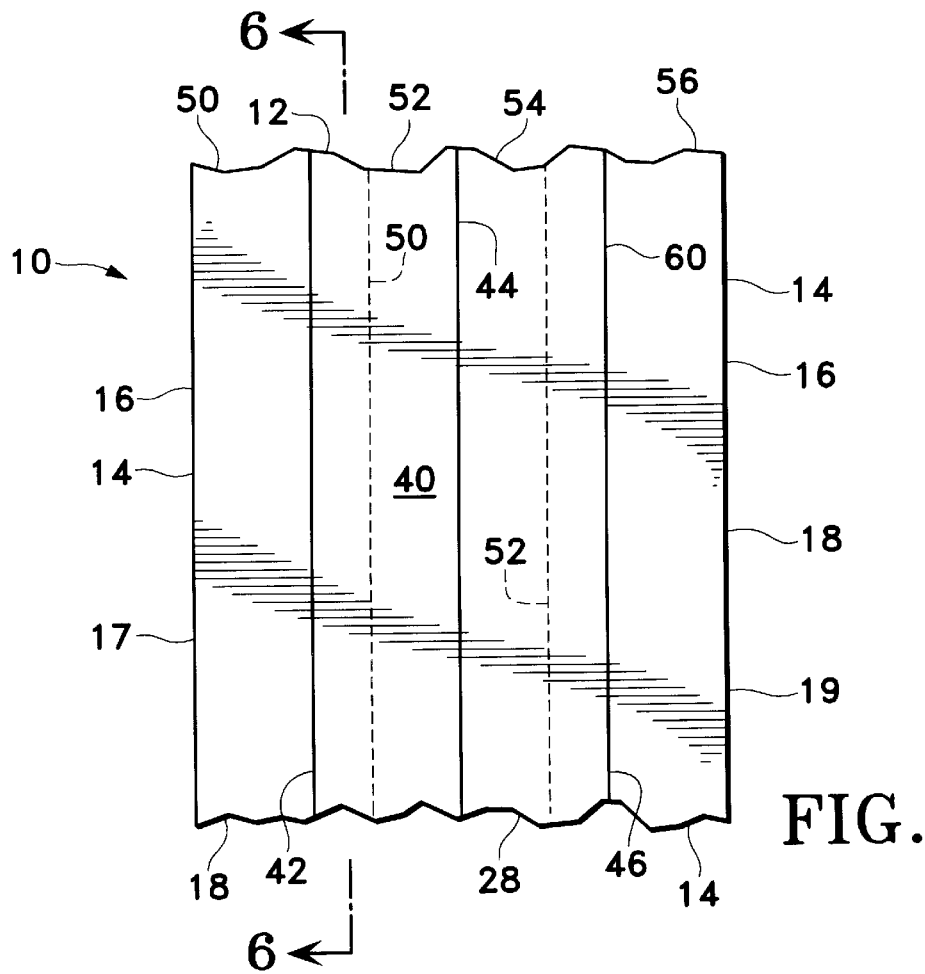
FIG. 5 is a bottom plan view of an alternative embodiment of a patch according to the present invention.

Referring now to FIG. 5, an alternative embodiment of the patch 10 includes a release liner 40 that covers the entire width of the patch 12, including the uncoated midsection 28. The release liner 40 is the top layer as seen in FIG. 5. The slits 42, 44 and 46 are cut through the release liner 40, but not through any other layers of the patch 10 and are longitudinally presented throughout the length of the roll of patch 10 material or other packaging of the patch 10. These lines of perforation 42, 44, and 46 allow the four resulting strips of release liner 50, 52, 54, and 56 to be removed separately in any order.

In use, the strip 52 is peeled away first, exposing a portion of the underlying adhesive strip 16, allowing the right-hand side of the patch 10 to be fixed to the wall surface 30 as described above. Next the release liner strip 50 is removed, exposing a further portion of the right-hand adhesive band 16, which is then adhered to the wall and smoothed. The release liner portions 54 and 56 remain yet attached and these allow the user to grasp the outer edges of the patch 10 without touching either of the adhesive bands 16, 18. Next the release liner strip 54 is removed and the patch 10 is grasped along the release liner strip 56 without touching any adhesive and the patch 10 is stretched across the crack 24 and the adhesive band 17 is secured to the wall 29. Finally, the release liner strip 56 is removed and the exposed adhesive is applied to the wall 29 and smoothed. Alternatively, the patch 10 can be applied in the opposite sequence, that is, removing in sequence release liner strips 54, 56, 52 and 50, using the same intermediate steps of applying adhesive and stretching as described above. This embodiment provides a superior bond with the wall surface 30, as the users hands never touch any of the adhesive, which can be degraded by the oils and dirt on a user's hands. Further, exposing sequential portions of the adhesive makes it easier to apply the patch 10 in the desired position.

The patch 10 may be used wherever a crack 24 appears in an interior wall or ceiling surface, regardless of the proximity of the crack 24 to windows or doors. In addition to its use for crack repair, the patch can be used to join any wall separation that is subject to expansion or contraction, for example, as a joint tape for sealing joints in sheetrock or drywall sections in new building construction.

While the present invention has been described in accordance with the preferred embodiments thereof, the description is for illustration only and should not be construed as limiting the scope of the invention. For example, the patch 10 material is preferably available on a roll, allowing users to cut off whatever length is required for a particular crack. Further, various changes and modifications may be made by those skilled in the art without departing from the spirit and scope of the invention as defined by the following claims. For example, other types of attachment can be used in lieu of pressure sensitive adhesive or double sided tape, provided that the method of attachment is relatively simple and quick. Some examples of additional alternative methods for attachment include thermally sensitive adhesives, contact cement, staples, and nails. It is also within the scope of the invention to include a method of attachment at each end of the patch 10 in the midsection area using any of the previously disclosed methods of attachment. The membrane itself may be heat curable, which allows an edge to be blended into the wall surface with the use of heat. The edges of the patch 10 can include a pattern, such as sawtooth pattern, continuous curve pattern, scallop pattern and the like to help blend the patch into the surrounding wall surface. Similarly, the adhesive bands can be perforated with trapezoids, circles, triangles, and other shapes. The function provided by the non-stretchable plastic film can also be achieved through other means, such as metal foil in place of the plastic film, or a special flexible membrane that is manufactured with non-stretchable bands along each edge. The patch 10 functions by redistributing subsequent wall movement across the width of the uncoated midsection of the elastic membrane 12, thus subjecting paint or wall textures applied over the patch to less concentrated stresses and thereby preserving the quality of the covering finish under most conditions of continuing wall movement.

I claim:

1. A patch for patching a crack in an interior wall comprising:
   a. an elastic membrane having a left-hand edge and a right-hand edge and a face side and a rear side;
   b. a left-hand permanent adhesive band adhered to said elastic membrane adjacent to said left-hand edge and a right-hand permanent adhesive band adhered to said elastic membrane adjacent to said right-hand edge;
   c. a release liner removably adhered to said left-hand permanent adhesive band and to said right-hand permanent adhesive band; and
   d. an uncoated midsection extending from one end of said patch to the other end of said patch comprising a length of elastic membrane between said left-hand edge and said right hand-edge characterized by the absences of adhesive.

2. A patch for patching a crack in an interior wall in accordance with claim 1 wherein said left-hand adhesive band and said right-hand adhesive bands further comprise a layer of plastic film having an upper surface and a lower surface and a layer of an adhesive spread on both said upper surface and said lower surface of said plastic film.

3. A patch for patching a crack in an interior wall in accordance with claim 2 wherein said plastic film further comprises a plastic film resistant to stretching.

4. A patch for patching a crack in an interior wall in accordance with claim 2 wherein said adhesive further comprises an acrylic adhesive.

5. A patch for patching a crack in an interior wall in accordance with claim 2 wherein said left-hand adhesive band and said right-hand adhesive band further comprise a uniform thickness.

6. A patch for patching a crack in an interior wall in accordance with claim 1 wherein said elastic membrane further comprises a uniform thickness.

7. A patch for patching a crack in an interior wall in accordance with claim 1 wherein said elastic membrane further comprises a polyvinyl chloride membrane.

8. A patch for patching a crack in an interior wall in accordance with claim 1 wherein said release liner fully covers said elastic membrane.

9. A patch for patching a crack in an interior wall in accordance with claim 1 wherein said elastic membrane further comprises a uniform thickness and a maximum thickness of 0.560 mm.

10. A patch for patching a crack in an interior wall in accordance with claim 1 wherein said release liner further comprises a release liner extending from said left-hand edge to said right-hand edge of said elastic membrane and release liner further comprises a plurality of parallel longitudinal slits throughout a length of said patch.

11. A patch for patching a crack in an interior wall comprising:

a. an elastic membrane of uniform thickness having a left-hand edge and a right-hand edge and a face side and a rear side;

b. a left-hand adhesive band adhered to said elastic membrane adjacent to said left-hand edge and a right-hand adhesive band adhered to said elastic membrane adjacent to said right-hand edge, wherein said left-hand adhesive band and said right-hand adhesive bands further comprise a layer of plastic film having an upper surface and a lower surface and a layer of an adhesive spread on both said upper surface and said lower surface of said plastic film; and c. a release liner removably adhered to said left-hand adhesive band and to said right-hand adhesive band.

12. A patch for patching a crack in an interior wall in accordance with claim 11 further comprising a plurality of spaced parallel slits cut through said release liner whereby said release liner can be removed in separate strips.

13. A patch for patching a crack in an interior wall in accordance with claim 12 further comprising three parallel slits cut through said release liner.

14. A patch for patching a crack in an interior wall in accordance with claim 11 wherein said adhesive further comprises an acrylic adhesive.

15. A patch for patching a crack in an interior wall in accordance with claim 11 wherein said elastic membrane further comprises a polyvinyl chloride membrane.

16. A patch for patching a crack in an interior wall in accordance with claim 11 wherein said elastic membrane further comprises a membrane having a Type A durometer hardness lying in a range between 40 and 100 and a permanent set of less than 5% when measured under the ETET.

17. A patch for patching a crack in an interior wall comprising: p1 a. an elastic membrane having a left-hand edge and a right-hand edge and a face side and a rear side;

b. a left-hand permanent adhesive band adhered to said elastic membrane adjacent to said left-hand edge and a right-hand permanent adhesive band adhered to said elastic membrane adjacent to said right-hand edge wherein said left-hand adhesive band and said right-hand adhesive bands further comprise a layer of plastic film having an upper surface and a lower surface and a layer of an adhesive spread on both said upper surface and said lower surface of said plastic film; and c. a release liner removably adhered to said left-hand permanent adhesive band and to said right-hand permanent adhesive band.

18. A patch for patching a crack in an interior wall in accordance with claim 17 wherein said plastic film further comprises a plastic film resistant to stretching.

19. A patch for patching a crack in an interior wall in accordance with claim 17 wherein said left-hand adhesive band and said right-hand adhesive band further comprise a uniform thickness.

20. A patch for patching a crack in an interior wall in accordance with claim 17 wherein said elastic membrane further comprises a uniform thickness.

21. A patch for patching a crack in an interior wall in accordance with claim 17 wherein said elastic membrane further comprises a polyvinyl chloride membrane.

22. A patch for patching a crack in an interior wall in accordance with claim 17 wherein said release liner fully covers said elastic membrane.

* * * * *